United States Patent [19]

Saiki et al.

[11] 4,121,252

[45] Oct. 17, 1978

[54] AUTOMATIC BRIGHTNESS LIMITER CIRCUIT

[75] Inventors: Yukimi Saiki; Masanori Oguino, both of Yokohama; Shutoku Watanabe, Ashiya, all of Japan

[73] Assignee: Hitachi, Ltd., Japan

[21] Appl. No.: 703,235

[22] Filed: Jul. 7, 1976

[30] Foreign Application Priority Data

Jul. 9, 1975 [JP] Japan .................................. 50/83504
Apr. 26, 1976 [JP] Japan .................................. 51/46568

[51] Int. Cl.² .......................... H04N 5/14; H04N 5/68
[52] U.S. Cl. .................................... 358/169; 358/243; 358/176
[58] Field of Search .................... 358/243, 169, 27, 39, 358/176

[56] References Cited

U.S. PATENT DOCUMENTS

| | | | |
|---|---|---|---|
| 3,147,341 | 9/1964 | Gibson .................................. | 358/169 |
| 3,735,029 | 5/1973 | Sunstein .............................. | 358/243 |
| 3,914,545 | 10/1975 | Engel .................................. | 358/243 |
| 4,017,681 | 4/1977 | Smeulers et al. .................... | 358/243 |

OTHER PUBLICATIONS

Kiver, *Television Simplified*, pp. 193-196, Van Nostrand Reinhold Co., 1973.

*Primary Examiner*—John C. Martin
*Attorney, Agent, or Firm*—Craig & Antonelli

[57] ABSTRACT

In a television receiver having a peak value type AGC circuit for maintaining the amplitude difference between a carrier zero level and the peak value of a composite video signal amplified by a high frequency amplifier and a video intermediate frequency amplifier at a constant magnitude, an automatic brightness limiter (ABL) circuit is provided which controls the AGC circuit such that when the beam current exceeds a predetermined value and the carrier zero level approaches the peak value, a composite video signal of reduced amplitude is produced.

6 Claims, 3 Drawing Figures

FIG. I

F I G. 2
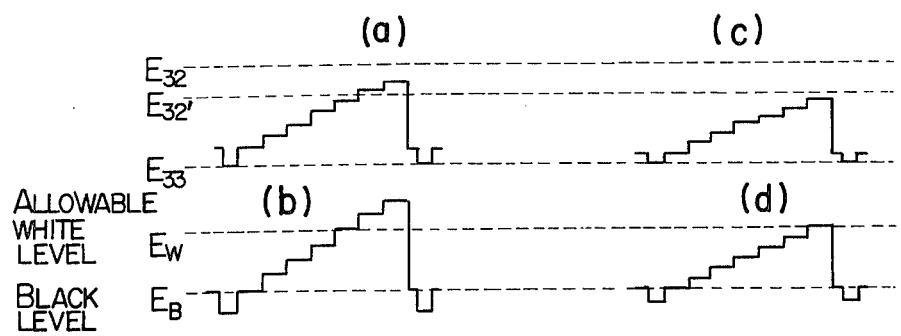
F I G. 3
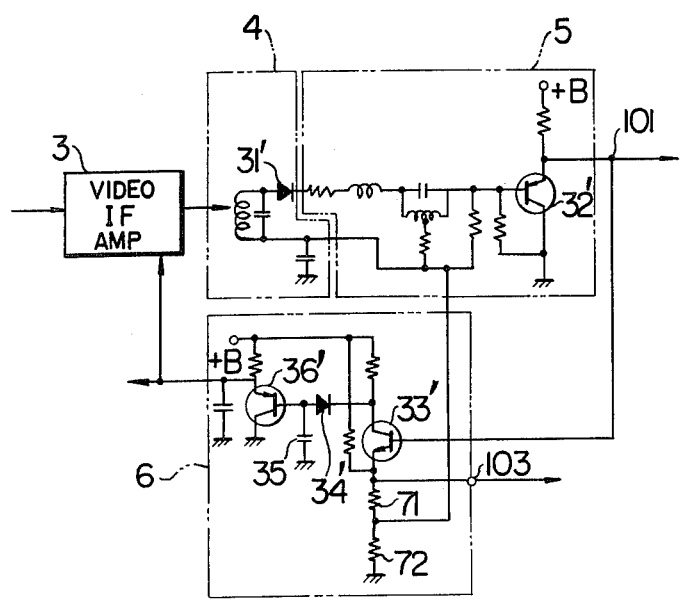

AUTOMATIC BRIGHTNESS LIMITER CIRCUIT

The present invention relates to an automatic brightness limiter circuit (hereinafter referred to as ABL circuit) of a television receiver.

In a television receiver, when a picture image of a high brightness is displayed, its sharpness decreases because the size of the beam spot of a CRT over a high brightness area increases, and at the same time the beam current increases at the high brightness area. If the beam current exceeds the effective electron emission amount of the cathode, the life of the CRT is shortened. Also, if an excess anode current flows, it exceeds a maximum allowable current of a high voltage rectifier element resulting in the breakage of the element.

For this reason, the television receiver is provided with an ABL circuit for limiting the beam current. In a simplest one of the known ABL circuit, upon the detection of the beam current exceeding a predetermined level, the D.C. level of a composite video signal to be fed to a CRT is shifted toward the black level of the composite video signal by causing a diode to conduct to reduce the beam current. In this ABL circuit, as a result of the shifting of the D.C. level, a half tone region near the black level of the composite video signal is reproduced as a black image and hence the reproduction of the half tone is deteriorated.

In another known ABL circuit which intended to overcome the above drawback, the amplitude of the composite video signal is reduced depending on an output voltage of the ABL circuit to lower the white level of the composite video signal while keeping the overall tone unchanged for preventing an excess beam current from flowing without losing the half tone. In this latter ABL circuit, in order to reduce the amplitude of the composite video signal the gain of the video amplifier which amplifies the composite video signal is lowered in response to the output voltage of the ABL circuit. In this case, as to the video intermediate frequency amplifier, little concern is given to the stability of gain because a feedback loop for automatic gain control (AGC) circuit is included. As to the video amplifier, since no automatic gain control circuit is provided, it has been a common practice to use a common emitter type transistor amplifier having a feedback resistor connected to the emitter in order to stabilize the gain. However, the more the resistance of the feedback resistor is increased to better stabilize the gain of the amplifier, the less control of the gain is obtainable by the D.C. level. Accordingly, in the latter ABL circuit, the video amplifier is constructed of a differential amplifier the gain of which can be controlled by a D.C. voltage and is stable over changes in temperature.

Using present-day technology, the video circuit can be manufactured at a lower cost by discrete circuit construction than through an integrated circuit construction. Therefore, the latter ABL circuit is more expensive and complicates the video amplifier.

Furthermore, in the latter ABL circuit, when the gain of the video amplifier is changed depending on the beam current, the black level of the composite video signal also changes with the white level. Although a clamp circuit may be provided in addition to the video amplifier for clamping the black level to a predetermined voltage, the clamp circuit responds only slowly so that when the ABL circuit operates the black level once deviates from the predetermined level and then gradually approaches the predetermined level and is finally clamped thereat. As a result, the displayed picture image temporarily increases its brightness when the ABL circuit operates. This presents an unnatural sensation to a viewer.

It is an object of the present invention to provide an automatic brightness limiter circuit which is simple in structure and inexpensive to manufacture.

It is another object of the present invention to provide an automatic brightness limiter circuit which can limit beam current without presenting an unnatural sensation to a viewer.

In order to achieve the above objects, the present invention comprises an amplifier for amplifying a signal including a composite video signal component and an automatic gain control circuit for detecting a change in the amplitude of the composite video signal after being amplified by the amplifier to change the gain of the amplifier in a direction to impede the change in amplitude, wherein a change in beam current is detected to produce a detection output indicating that the beam current has exceeded a predetermined level, which detection output is used to control the control level of the automatic gain control circuit to reduce the gain of the amplifier for the signal including the composite video signal component whereby the amplitude of the composite video signal is reduced to reduce the beam current.

Other objects and advantages of the present invention will be apparent from the following description of preferred embodiments referring to the accompanying drawings, in which:

FIG. 2 shows voltage waveforms of a brightness signal at major points in FIG. 1; and FIG. 3 shows a circuit diagram of a modification of a major part of FIG. 1.

Figure 1:
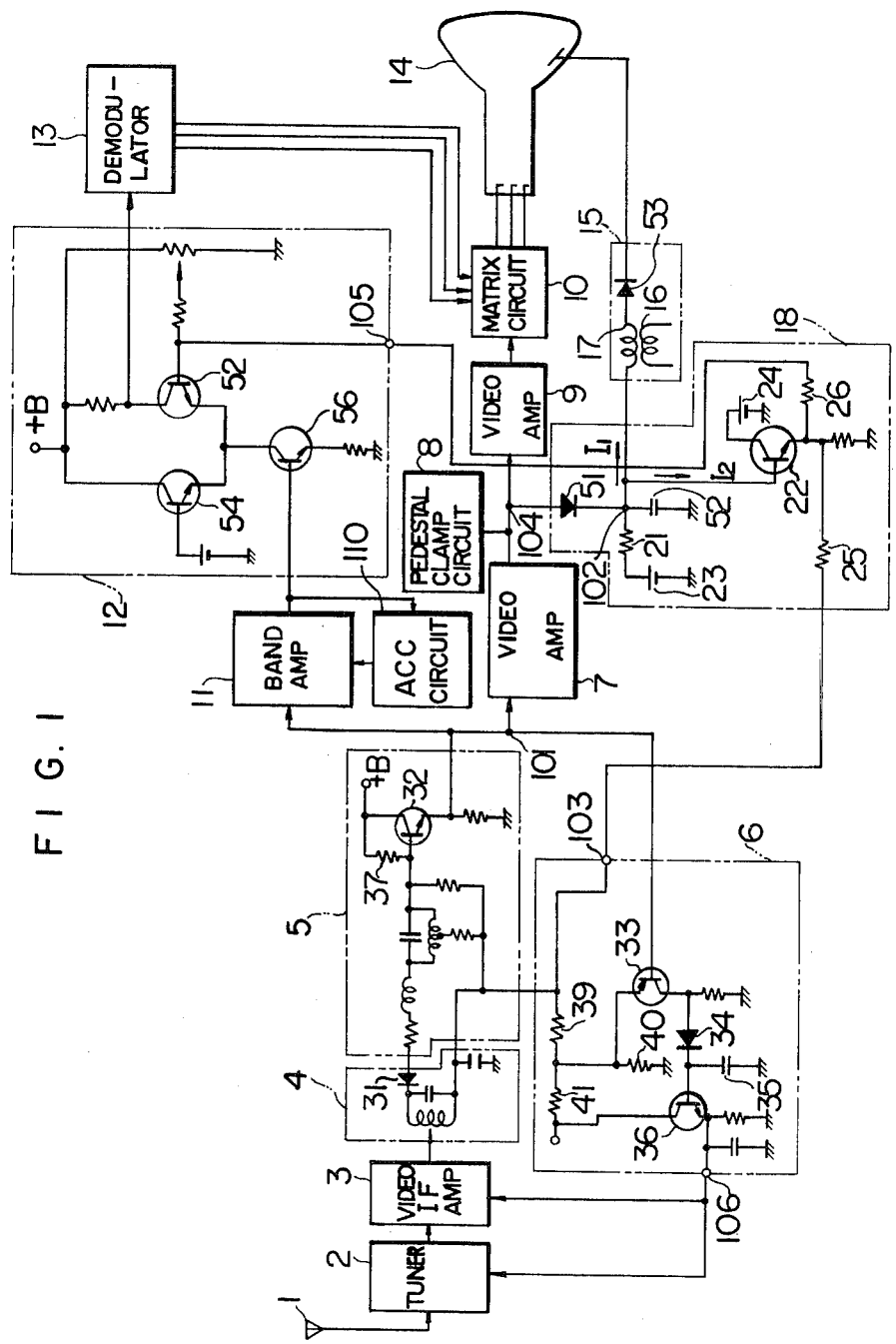
FIG. 1 shows a circuit diagram of one embodiment of an automatic brightness limiter circuit of the present invention.

Referring to FIG. 1, a color television receiver to which the present invention is applied will be first explained.

A color television broadcast signal including a composite color video signal component received by an antenna 1 is channel selected and R.F. amplified by a tuner 2 including an R.F. amplifier and converted to a video intermediate frequency signal, which is fed to a video intermediate frequency (I.F.) amplifier 3.

The video I.F. signal amplified by the video I.F. amplifier 3 is detected by a video detector 4 to produce a composite color video signal, which is amplified by a first video amplifier 5. (In the present embodiment it is impedance converted.)

An automatic gain control (AGC) circuit 6 controls the gains of the R.F. amplifier in the tuner 2 and the video I.F. amplifier 3 such that irrespective of the change in input electric field strength the amplitude difference between a carrier zero level (a first predetermined level) and the synchronizing signal peak value (a second predetermined level) of the composite video signal at a node 101 is kept at a constant value.

Of the composite color video signal produced at the node 101, the composite video signal is amplified by a second video amplifier 7 and D.C. restored by a pedestal clamp circuit 8 and then passed through a third video amplifier 9 to a matrix circuit 10. On the other hand, the carrier color signal of the composite color video signal is fed through a first band-pass amplifier 11 and a second band-pass amplifier 12 to a color difference signal demodulator 13, which produces at the outputs thereof color difference signals R-Y, B-Y and G-Y, which are fed to a matrix circuit 10. The matrix circuit 10 combines the brightness signal in the composite video signal with the color difference signals to produce original color signals R, G, B to control the electron beam operation of a color CRT 14. An automatic chrominance control (ACC) circuit 110 controls the gain of the first band-pass amplifier 11 so as to keep the amplitude of a burst signal produced at the output of the first band-pass amplifier 11 at a constant magnitude whereby the color saturation is properly adjusted. A high voltage generator circuit 15 rectifies a flyback pulse developed across a high voltage winding 17 of a flyback transformer 16 by a diode 53 and supplies the rectified voltage to the anode of the color CRT 14.

The ABL circuit 18 of the present invention detects the change in beam current to produce an output signal when the beam current exceeds a predetermined level, which output signal is fed to the AGC circuit 6 and the second band-pass amplifier 12, respectively. The AGC circuit 6 is controlled by the output signal to change its control level so that an AGC voltage produced at the output thereof is changed to reduce the gain of the video I.F. amplifier 3. The gain of the second band-pass amplifier 12 is reduced by said the signal.

The operations of the AGC circuit 6 and the ABL circuit 18 are explained below.

The AGC circuit 6 operates to keep the amplitude difference between the carrier zero level and the synchronizing signal peak value of the composite video signal appearing at the node 101 at a constant magnitude.

Namely, the composite video signal as shown in FIG. 2(a) appears at the node 101. The potential of the carrier zero level thereof is equal to a base bias voltage $E_{32}$ (first preset level) of a first video amplifier transistor 32, which is determined by a resistor 37. On the other hand, the AGC circuit 6 peak detects the composite video signal shown in FIG. 2(a) by an AGC detection transistor 33, and the detected voltage is rectified and filtered by a diode 34 and a capacitor 35 and then amplified by a transistor 36 to produce an AGC voltage, which is fed from a terminal 106 to the R.F. amplifier in the tuner 2 and the video I.F. amplifier 3 to control the gains of the R.F. amplifier and the video I.F. amplifier 3 so as to maintain a constant detected voltage. Accordingly, the peak voltage of the composite video signal appearing at the node 101 is determined the an emitter bias voltage $E_{33}$ (second preset level) of the AGC detection transistor 33. In the present embodiment, the discharging time constant of the capacitor 35, and the emitter resistor of the transistor 36 is so chosen that the peak voltage of the composite video signal is substantially equal to the voltage $E_{33}$.

The composite video signal having its measured from the carrier zero level to the synchronizing signal peak kept constant in the manner described above is then amplified by the second video amplifier and D.C. restored by the pedestal clamp circuit 8 so that a pedestal portion of the amplified composite video signal comes to a predetermined voltage $E_B$ as shown in FIG. 2(b).

If a low brightness composite video signal whose white level after being D.C. restored does not reach an allowable white level $E_W$ appears at a node 104, a small beam current $I_1$ flows and the transistor 22 is supplied with a base current $I_2$ until it is saturated so that a voltage $E_{102}$ at a node 102 is fixed to $E_{24} - V_{CE} + V_{BE}$, where $E_{24}$ is a power supply 24 (shown as a battery in the illustrated embodiment) for driving the transistor 22, $V_{CE}$ is the collector-emitter voltage of the transistor 22 at saturation, and $V_{BE}$ is the base-emitter voltage of the transistor 22 at saturation.

Namely, as long as the transistor 22 is in saturation, a constant current provided by the battery 24 flows through the emitter circuit to maintain the voltage $E_{102}$ at the node 102 at a constant magnitude and the emitter voltage of the transistor 22 is kept constant. A capacitor 52 serves to eliminate a high frequency component from the beam current flowing through the resistor 21 during the horizontal period.

On the other hand, when a composite video signal having a white peak level which exceeds the allowable white level $E_W$ as shown in FIG. 2(b) appears at the node 104, that is, when a composite video signal having a brightness sufficiently high to cause a large voltage drop to be developed across the resistor 21 (beam current detection circuit) to prevent transistor 22 from staying in its saturation state, appears at the node 104, an excess beam current flows and the voltage $E_{102}$ at the node 102 falls below $E_{24} - V_{CE} + V_{BE}$ causing the transistor 22 to shift from the saturation state to the active state. Accordingly, the emitter voltage of the transistor 22 falls with the fall of the voltage $E_{102}$. This lowered emitter voltage is transmitted as the output signal of the ABL circuit 18 to a terminal 103 of the AGC circuit 6 through a resistor 25, and to a terminal 105 of the second band-pass amplifier through a resistor 26.

As the voltage at the terminal 103 falls, the base bias voltage of the first video amplifier transistor 32 falls from the voltage $E_{32}$ to a voltage $E'_{32}$. That is, one of the first and second preset levels approaches the other. In this case, it is sufficient that at least one of the levels changes. On the other hand, the resistances of the resistors 40 and 41 are chosen to be sufficiently smaller than the resistance of the resistor 39. As a result, even if the voltage at the terminal 103 varies, the emitter bias voltage of the AGC detection transistor 33 does not substantially change. Since the AGC circuit 6 controls the gains of the R.F. amplifier and the video I.F. amplifier 3 such that the carrier zero level of the composite video signal coincides with the voltage $E'_{32}$ and the peak value coincides with the voltage $E_{33}$, the white level of the composite video signal appearing at the node 101 is lowered as shown in FIG. 2(c) and the amplitude of the composite video signal is reduced.

Therefore, the white level of the composite video signal appearing at the node 104 is lowered to the allowable white level $E_W$ as shown in FIG. 2(d). Namely, when the voltage $E_{102}$ at the node 102 falls below $E_{24} - V_{CE} + V_{BE}$, the ABL circuit 18 produces an output voltage which varies with the drop of the voltage $E_{102}$ and the carrier zero level of the negative polarity composite video signal having its peak value clamped to the voltage $E_{23}$ is lowered in accordance with the output voltage. Thus, the amplitude of the composite video signal at the node 104 is reduced in accordance with the voltage drop at the node 102 to limit the increase of the beam current.

As described above, in accordance with the present invention, when the beam current increases beyond the predetermined level, the AGC circuit 6 is controlled to reduce the gain of the R.F. amplifier or the I.F. amplifier 3 in order to reduce the amplitude of the composite video signal. Accordingly, the video amplifier 7 does not require a differential amplifier circuit as required in the prior art and can use an amplifier of a simpler configuration such as a common emitter type transistor amplifier.

Furthermore, since the peak voltage of the composite video signal is fixed to cause the carrier zero level to be shifted toward the peak value, that is, to cause the white level to be shifted toward the peak value when the amplitude of the composite video signal appearing at the node 101 is to be reduced, the black level of the composite video signal is not substantially influenced and hence the brightness of the picture image does not temporarily increase in an unnatural manner when the ABL circuit 18 operates.

For the purpose of reducing the amplitude of the carrier color signal when the amplitude of a brightness signal in the composite video signal decreases in order to balance the brightness of the displayed picture image with the color saturation, the output signal of the ABL circuit 18 is supplied to the second band-pass amplifier 12. Consequently, the gain of the differential amplifier including transistors 52, 54, 56 decreases with the decrease of the voltage at the terminal 105.

When a composite video signal having a brightness signal of higher brightness than that of the brightness signal shown in FIG. 2, for example a brightness signal indicating a picture including a large white area and a small black area such as character area, is received, the beam current further increases and the voltage $E_{102}$ at the node 102 falls below the voltage $E_{104}$ at the node 104. As a result, the diode 51 conducts to lower the D.C. level of the composite video signal appearing at the node 104. That is, for the brightness signal including less black level information and much white level information, which causes substantial increase of the beam current, the diode 51 is conducted to lower the D.C. level of the composite video signal to further reduce the beam current.

FIG. 3 shows a circuit diagram of another embodiment of the AGC circuit 6.

In FIG. 3, transistors 32', 33', 36' are of opposite conductivity type to the transistors 32, 33, 36 and diodes 31', 36' are connected in an opposite direction relative to the diodes 31 and 36. A positive composite video signal appears at the node 101 and it is peak detected by the AGC detection transistor 33'. Therefore, the emitter voltage of the transistor 33' determines the peak voltage of the composite video signal appearing at the node 101, and the base bias voltage of the transistor 32' determines the voltage of the carrier zero level. That is, the AGC circuit 6 of FIG. 3 controls the gain of the R.F. amplifier or the video I.F. amplifier 3 such that the carrier zero level of the composite video signal appearing at the node 101 coincides with the base bias voltage of the transistor 32' and the peak value coincides with the base bias voltage of the transistor 32'.

Accordingly, when the voltage at the terminal 103 falls, the emitter bias voltage of the transistor 33' falls so that the peak voltage of the composite video signal appearing at the terminal 101 falls. On the other hand, when the voltage at the terminal 103 falls, the voltage at the junction of the resistors 71 and 72 falls and the base bias voltage of the transistor 32' also falls and the voltage of the carrier zero level appearing at the junction 101 also falls. But since the voltage at the junction of the resistors 71 and 72 is a fraction of the voltage at the terminal 103 divided by the resistors 71 and 72, the voltage drop at the junction of the resistors 71 and 72 is smaller than the voltage drop at the terminal 103. Therefore, as the voltage at the terminal 103 decreases, the amplitude of the composite video signal appearing at the node 101 is reduced.

It should be understood that instead of the AGC circuits shown in FIGS. 1 and 3 which operate to keep the amplitude measured from the carrier zero level to the peak value of the composite video signal at a constant magnitude, an AGC circuit which operates to keep the amplitude from the pedestal portion to the synchronizing signal peak point or the amplitude of predetermined section indicating the magnitude of the composite video signal, such as a mean value of the composite video signal, at a constant magnitude may be used provided that the amplitude which is to be kept constant by the AGC circuit is changed in the direction to reduce the gain of the R.F. amplifier or the video I.F. amplifier 3 by the output voltage of the ABL circuit 18.

What is claimed is:

1. A television receiver comprising:
   an amplifier adapted to receive a television signal including a composite video signal component having a first predetermined level which is a carrier zero level and a second predetermined level which is a synchronizing signal peak value, for amplifying said television signal;
   a detector for detecting the amplified television signal to produce a composite video signal;
   an automatic gain control circuit for comparing said second predetermined level in the detected composite video signal with a preset level while fixing said first predetermined level in the detected composite video signal at a first fixed level and controlling the gain of said amplifier in the direction to cause said second predetermined level to coincide with said preset level;
   a CRT adapted to receive the detected composite video signal;
   a power supply for supplying a beam current to the CRT; and
   beam current limiting means connected to the CRT and the power supply for reducing the beam current when it exceeds a predetermined level to prevent the increase of the beam current;
   said beam current limiting means including:
   detection means for detecting the change in the beam current; and
   control means for receiving an output signal from said detection means and causing said first predetermined level to approach toward said second predetermined level when the beam current exceeds said predetermined level so that the composite video signal having its first and second predetermined levels closer to each other is produced at the output of the of the detection means;
   whereby the automatic gain control circuit causes the gain of said amplifier to reduce.

2. A television receiver according to claim 1 wherein said control means of the beam current limiting means produces a control signal when the beam current exceeds said predetermined level and supplies said control signal to said automatic gain control circuit, and the automatic gain control circuit supplies an automatic gain control signal for reducing the gain of said amplifier to said amplifier.

3. A television receiver in accordance with claim 1, in which said television signal includes a chrominance signal component;

said television receiver comprises a chrominance signal detector for detecting said chrominance signal component from said television signal and a chrominance signal amplifier for amplifying said detected chrominance signal component; and said control means reduces the gain of said chrominance signal amplifier correspondingly to said output signal from said detection means.

4. An automatic brightness limiter circuit for a television receiver comprising:

an amplifier for receiving and amplifying a television signal including a composite video signal component having a white level and a black level;

a detector for detecting said composite video signal component from said amplified television signal;

an automatic gain control circuit for detecting the change of the amplitude proportional to the difference between said white and black levels of said composite video signal component in the detected output of said detector to control the gain of said amplifier in a direction to suppress said change and maintain said amplitude at a fixed magnitude;

a CRT for receiving said composite video signal component whose amplitude difference change is supressed;

a power supply for supplying a beam current responsive to said composite video signal component to said CRT;

detection means for detecting a change in said beam current and generating a detecting signal which is responsive to the excess amount of said detected change in said beam current when it exceeds a predetermined current reference level; and control means, responsive to said detecting signal, for reducing said fixed magnitude by causing said white level to approach toward said black level without said black level being substantially shifted in said composite video signal component in the detected output of said detector.

5. An automatic brightness limiter circuit for a television receiver according to claim 4, in which said amplitude proportional to the difference between said white and black levels of said composite video signal is the difference between a carrier zero level and a synchronizing signal peak level.

6. An automatic brightness limiter circuit for a television receiver according to claim 5, in which said control means controls said carrier zero level correspondingly to said detecting signal with said synchronizing signal peak level being fixed.

* * * * *